(12) United States Patent
Hirose et al.

(10) Patent No.: US 7,339,733 B2
(45) Date of Patent: Mar. 4, 2008

(54) FRESNEL LENS SHEET AND REAR PROJECTION SCREEN USING IT

(75) Inventors: Kazunori Hirose, Tainai (JP); Makoto Toyohara, Tainai (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 10/583,136

(22) PCT Filed: Dec. 16, 2004

(86) PCT No.: PCT/JP2004/019270

§ 371 (c)(1),
(2), (4) Date: Jun. 16, 2006

(87) PCT Pub. No.: WO2005/059642

PCT Pub. Date: Jun. 30, 2005

(65) Prior Publication Data

US 2007/0159692 A1 Jul. 12, 2007

(30) Foreign Application Priority Data

Dec. 17, 2003 (JP) .............................. 2003-418896

(51) Int. Cl.
*G03B 21/56* (2006.01)
*G03B 21/60* (2006.01)
*G02B 3/08* (2006.01)

(52) U.S. Cl. ...................... 359/457; 359/460; 359/742

(58) Field of Classification Search ................ 359/457, 359/460, 742, 743
See application file for complete search history.

(56) References Cited

U.S. PATENT DOCUMENTS

| | | | | |
|---|---|---|---|---|
| 3,712,707 A | * | 1/1973 | Henkes, Jr. .................. | 359/448 |
| 6,807,020 B2 | * | 10/2004 | Wolfe .......................... | 359/742 |
| 6,900,945 B2 | * | 5/2005 | Mori et al. .................. | 359/619 |
| 7,190,517 B2 | * | 3/2007 | Abe et al. .................... | 359/457 |

FOREIGN PATENT DOCUMENTS

| | | |
|---|---|---|
| JP | 2000-180968 | 6/2000 |
| JP | 2003-066206 | 3/2003 |

\* cited by examiner

*Primary Examiner*—Christopher Mahoney
(74) *Attorney, Agent, or Firm*—Oblon, Spivak, McClelland, Maier & Neustadt, P.C.

(57) ABSTRACT

A Fresnel lens sheet which is bright due to a small light quantity loss, is restricted in speckles and ghosts, does not produce moires, and can be used in an inexpensive transmitting screen, wherein the sheet satisfies the diffusion characteristics of the following expressions (1) and (2), or the following expressions (3), (4) and (5). $\gamma/\alpha \le 2.8$ (1) $\zeta/\alpha \le 6$ (2), where $\alpha$ is viewing half value angle, $\gamma$ viewing $1/10$ value angle, and $\zeta$ viewing $1/100$ value angle. $2.0° \le \alpha \le 5.5°$ (3), where $\alpha$ is viewing half value angle, $\gamma \le 12°$ (4), where $\gamma$ is viewing $1/10$ value angle, $\zeta \le 18°$ (5), where $\zeta$ is viewing $1/100$ value angle.

5 Claims, 4 Drawing Sheets

Fig. 3
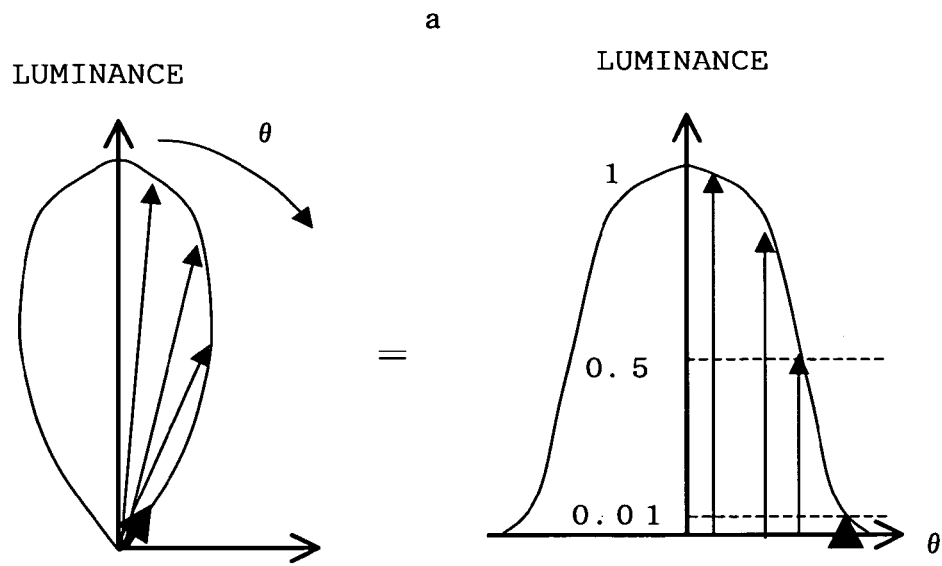
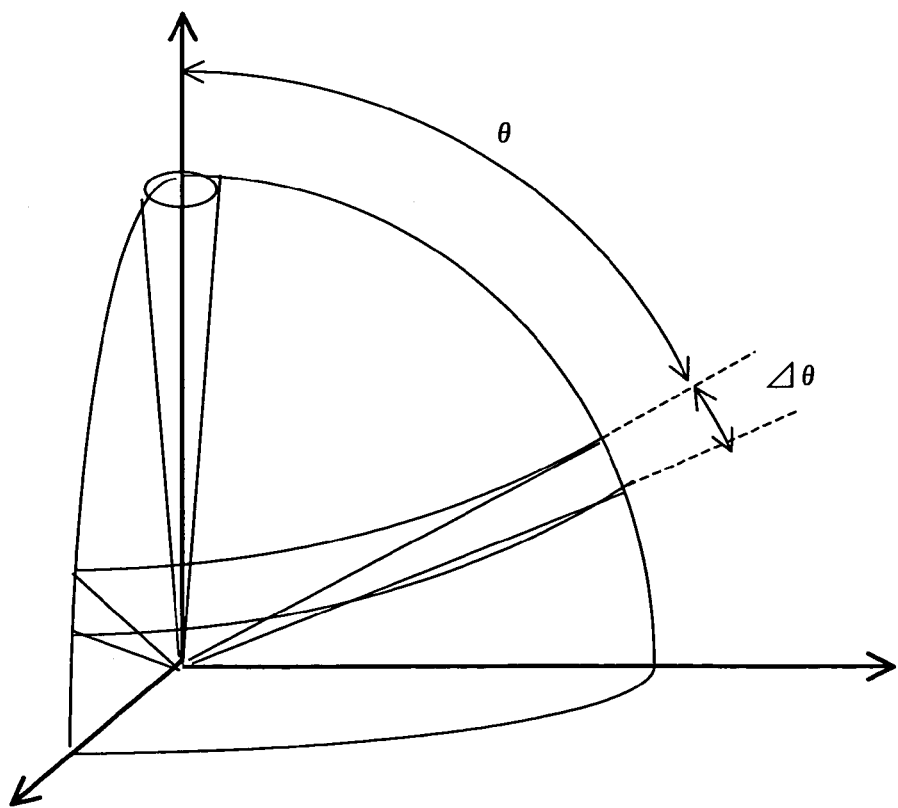

Fig.5
a
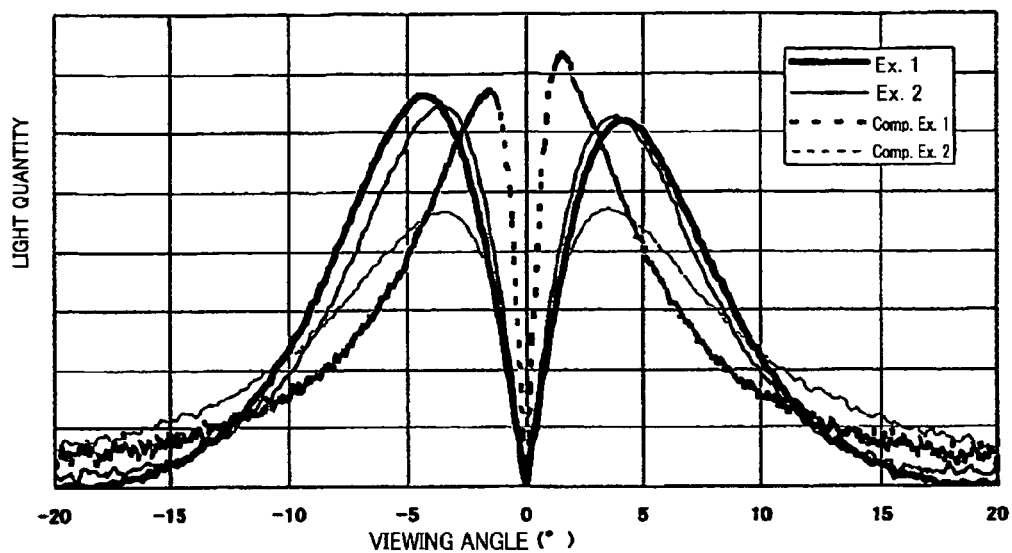
b
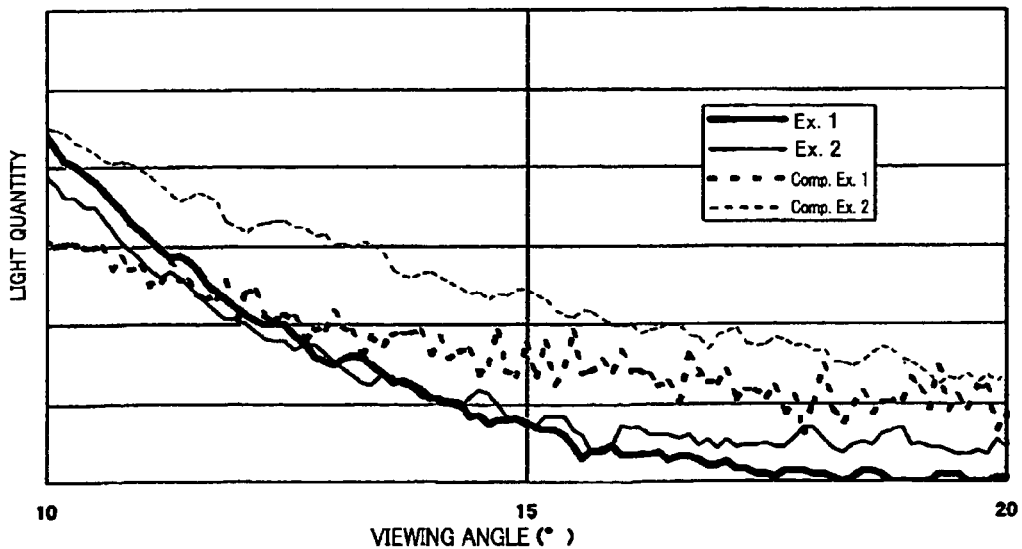

FRESNEL LENS SHEET AND REAR PROJECTION SCREEN USING IT

FIELD OF THE INVENTION

The present invention relates to a Fresnel lens sheet and a rear projection screen, which are used in a rear projection type television and the like.

BACKGROUND ART

FIG. 1 is a schematic configuration diagram showing a cross section of a conventional transmitting screen that is generally used in a rear projection type television. In FIG. 1, reference numeral 1 indicates a lenticular lens sheet, and reference numeral 2 indicates a Fresnel lens sheet. Usually, the Fresnel lens sheet 2 and the lenticular lens sheet 1 are placed being adjacent to each other, thereby configuring the transmitting screen. In general, the Fresnel lens sheet 2 is made of a sheet whose light outgoing surface is provided with a Fresnel lens comprising lenses arranged with fine pitches, equally spaced in a form of concentric circles (see Japanese Patent Laid-Open publication No. 59-69748).

As shown in FIG. 1, on the lenticular lens sheet 1, hog-backed lenses are placed on the side of light incidence plane, in such a manner as evenly spaced apart from each other. Outgoing parallel light or convergence light from the Fresnel lens sheet 2 is largely diffused horizontally by the lenticular lens sheet 1, thereby enabling observation of an image in a wide viewing range in the horizontal direction.

In the lenticular lens sheet 1 as described above, as shown in FIG. 1, contrast in a bright room is improved, by providing a shading pattern comprising a layer of light absorption material such as black ink, on a part other than a portion where lights are converged by each lens that are provided on the light incidence plane side.

In the Fresnel lens sheet, for the purpose restricting a stray light or the like so as to expand the range where image observation is possible not only horizontally but also vertically, it has been performed that a diffusion material is mixed inside, a vertical lenticular lens as disclosed in the Japanese Patent Laid-Open Publication No. 60-263932, or a prism shape as disclosed in the Japanese Patent Laid-Open Publication No. 11-271884 are provided on the incidence plane. In addition, in order to restrict speckles of image light (fine variations in brightness, and dazzling), there has been disclosed, in the Japanese Patent Laid-open Publication No. 8-313865, a method to increase Haze (to intensify diffusivity) of the Fresnel lens sheet. Japanese Patent Laid-Open Publication No. 2000-275738 discloses a technique to define a particular range as diffusion characteristics of the Fresnel lens sheet.

Conventionally, in giving diffusion characteristics to the Fresnel lens sheet, there have been problems including the following:

1) it is possible to consider that the diffusion characteristics are obtained by forming vertical diffusive lenticular lens and prism lines with even pitches on the incidence plane of the Fresnel lens sheet. However, there has been a problem that moire may occur with the Fresnel lens and the lenticular lens;

when a general diffusing material is used for giving the diffusivity, 2) the diffusing material itself may cause generation of speckles;

3) since the diffusion characteristics show a tailing pattern (relatively small in a medium angle region and relatively large in a high angle region), a tailing component (scattered light in the high angle region) among transmitted light that has passed through the Fresnel lens sheet, is cut off by the light shielding pattern portion of the lenticular lens, thereby causing a loss in light quantity;

4) ghosts such as double image are formed due to the light path as shown in FIG. 2, but in the diffusion by a conventional diffusing material, such ghosts have not been able to be reduced sufficiently; and 5) since a diffusing agent is expensive, it has been disadvantageous in cost wise.

The present invention has been made to solve the above problems and the object thereof is to provide a Fresnel lens sheet which is bright due to a small light quantity loss, restricted in speckles, does not produce moire, restricted in ghosts, and in addition, it is inexpensive.

SUMMARY OF THE INVENTION

It is possible to achieve the above object, by providing a Fresnel lens sheet that is used in a rear projection screen, wherein, diffusion characteristics thereof are defined to be in the range of the following expression (1) and expression (2), $$\gamma/\alpha \leq 2.8 \quad (1)$$

$$\zeta/\alpha \leq 6 \quad (2)$$

here, $\alpha$ indicates viewing half value angle (at this angle, luminance is made to half of the luminance facing to the front), $\gamma$ indicates viewing 1/10 value angle (at this angle, luminance is made to 1/10 of the luminance facing to the front), and $\zeta$ indicates viewing 1/100 value angle (at this angle, luminance is made to 1/100 of the luminance facing to the front).

It is also possible to achieve the above object, by providing a Fresnel lens sheet that is used in a rear projection screen, wherein the diffusion characteristics thereof are defined to be within the range of the following expression (3), expression (4), and expression (5), $$2.0° \leq \alpha \leq 5.5° \quad (3)$$

here, $\alpha$ indicates viewing half value angle;

$$\gamma \leq 12° \quad (4)$$

here, $\gamma$ indicates viewing 1/10 value angle; and $$\zeta \leq 18° \quad (5)$$

here, $\zeta$ indicates viewing 1/100 value angle.

In addition, the Fresnel lens sheet as described above has fine concavity and convexity on the incidence plane, and these concavity and convexity may be defined to be within the range as indicated by the following expression (6):

$$0.5 \ \mu m \leq Ra \leq 2.0 \ \mu m \quad (6),$$

here, Ra indicates a central line average roughness that is prescribed in JIS B 0601.

The present invention to solve the above problems is directed to a rear projection screen comprising at least a lenticular lens sheet and the Fresnel lens sheet having been described above.

BRIEF DESCRIPTION OF DRAWINGS

FIG. 3 includes illustrations showing that an outgoing light quantity towards a wide viewing angle region is large.

FIG. 5 includes charts showing viewing angle light quantity characteristics, which are standardized by the total outgoing light quantity in the embodiments and the comparison examples in the present invention.

BEST MODE FOR CARRYING OUT THE INVENTION

Figure 1:
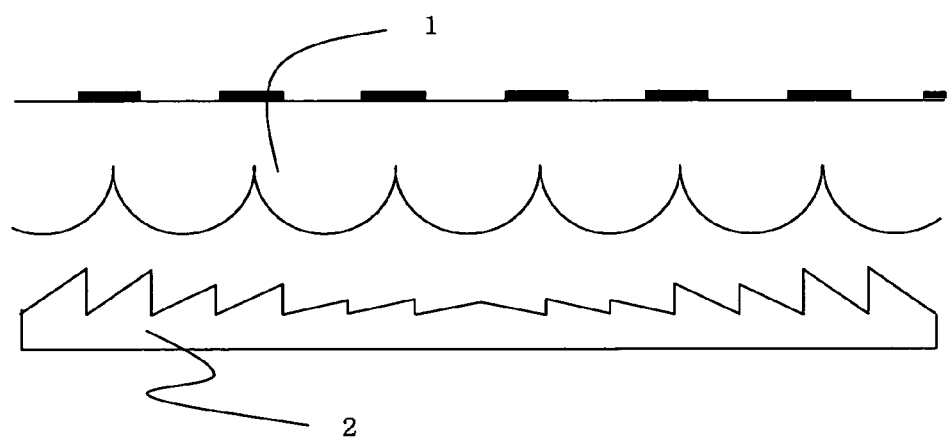
FIG. 1 is a schematic cross sectional view showing a transmitting screen which is generally used in a rear projection type television.

A Fresnel lens sheet according to the present invention, which satisfies the diffusion characteristics indicated in the following expressions (1) and (2), or the expressions (3), (4), and (5), are accompanied by sufficient Haze, thereby achieving an effect of moire reduction. In addition, by satisfying the above diffusion characteristics, it is possible to achieve a vertical viewing angle which is sufficiently wide, and simultaneously also achieve another feature that loss of a light quantity is small, because a tailing part is small which is absorbed by a shielding pattern of a lenticular sheet, among a transmitted light that has passed through the Fresnel lens sheet:

$$\gamma/\alpha \leq 2.8 \qquad (1); \text{ and}$$

$$\zeta/\alpha \leq 6 \qquad (2)$$

here, $\alpha$ indicates viewing half value angle, $\gamma$ indicates viewing 1/10 value angle, and $\zeta$ indicates viewing 1/100 value angle, $$2.0° \leq \alpha \leq 5.5° \qquad (3)$$

here, $\alpha$ indicates viewing half value angle, $$\gamma \leq 12° \qquad (4)$$

here, $\gamma$ indicates viewing 1/10 value angle, and $$\zeta \leq 18° \qquad (5)$$

here, $\zeta$ indicates viewing 1/100 value angle.

As described above, conventionally, diffusivity is given to the Fresnel lens sheet for the purpose of reducing speckles, and when this diffusing characteristics of the Fresnel lens sheet are intensified, the shielded light quantity is increased, which is shielded by the shielding light pattern portion of the lenticular lens sheet that is placed on the outgoing side. Therefore, it may cause a loss of light quantity. The inventor of the present invention has attained, as a result of a zealous study, a screen which satisfies both reduction of speckles and avoidance of light quantity loss, by use of the Fresnel lens sheet having the above diffusing characteristics. This outcome has been achieved by taking notice of the viewing 1/100 value angle ($\zeta$), in particular. As shown in FIG. 3a, in the viewing angle region where the luminance becomes one-hundredth of the front luminance, the luminance is, literally, only one-hundredth comparing to the luminance facing to the front. Therefore, the diffusing characteristics in this region have not been regarded as important so far. However, as shown in FIG. 3b, even in this angle region, the total quantity of light outgoing with a certain angle range towards whole surroundings centering on the front direction is much larger than the quantity which can be assumed from the luminance that indicates the light quantity in only one certain direction. This is because, the total quantity of the light outgoing in the direction of certain angle $\theta$ is equal to a value obtained by multiplying the luminance value at the angle $\theta$ by the perimeter on a unit spherical surface, and it is equal to the function of $\sin \theta$. Usually, the diffusivity is intensified, not only the viewing half value angle is increased, but also the viewing 1/100 value angle is increased. Therefore, even if it seems a little increase of luminance in such a large angle, the quantity of light for the entire angular region is enormously increased. In the Fresnel lens sheet according to the present invention, the ratio of the viewing 1/10 value angle to the viewing half value angle and the ratio of the viewing 1/100 value angle to the half value angle are set to equal to or less than the above constant value, or the viewing half value angle is set to within the above constant range, and the values of the viewing 1/10 value angle and the viewing 1/100 value angle are set to equal to or less than the above constant values, thereby restricting an increase of quantity of light in the peripheral part, as well as securing diffusivity. As a result, in the rear projection screen structured by combining the Fresnel lens sheet according to the present invention and a lenticular lens sheet, it is possible to achieve operational effects of the present invention, i.e., restricting light quantity loss and reducing speckles, simultaneously.

If the ratio $\zeta/\alpha$ of the viewing 1/100 value angle $\zeta$ to the viewing half value angle $\alpha$ is larger than 6, ratio of light rays in the periphery part direction becomes larger with respect to the proximity of the front side. Therefore, the ratio of light quantity loss to outgoing light quantity is increased. The same result may occur when the ratio $\delta/\alpha$ of the viewing 1/10 value angle $\delta$ to the viewing half value angle $\alpha$ is larger than 2.8. It is preferable that $\zeta/\alpha$ is equal to or less than 4, and $\delta/\alpha$ is equal to or less than 2.2.

When the viewing half value angle $\alpha$ is equal to or less than 2.0°, sufficient diffusion characteristics cannot be obtained and the vertical viewing angle becomes narrower. At the same time, it becomes difficult to sufficiently restrict moire, ghosts, and the like. When it is equal to or more than 5.5°, the viewing angle property becomes so wide that it is not possible to obtain necessary gains. A preferred range of the viewing half value angle $\alpha$ is from 4° to 5°.

When the viewing 1/100 value angle $\zeta$ is equal to or more than 18°, or the viewing 1/10 value angle $\gamma$ is equal to or more than 12°, the tailing part substance of light rays which are absorbed by the shielding pattern portion of the lenticular lens sheet is increased. Therefore, it is not possible to obtain necessary gains any more. It is preferable that the viewing 1/100 value angle $\zeta$ is equal to or more than 12°. When it is equal to or less than 12°, a problem may occur, so-called hot-band phenomenon, in which brightness of the screen becomes dark rapidly in the vertical viewing angle within a certain range or more. For the same reason, it is preferable that the viewing 1/10 value angle $\gamma$ is equal to or more than 7°. A preferable range of the viewing 1/100 value angle $\zeta$ is from 12° to 15°.

Since major diffusivity is obtained by fine concavity and convexity on the incidence plane surface of the Fresnel lens sheet, which satisfies the following condition, occurrence of speckles due to a use of diffusive material may be restricted to a large extent.

$$0.5 \ \mu m \leq Ra \leq 2.0 \ \mu m \qquad (6)$$

here, Ra indicates a central line average roughness prescribed in JIS B 0601.

Figure 2:
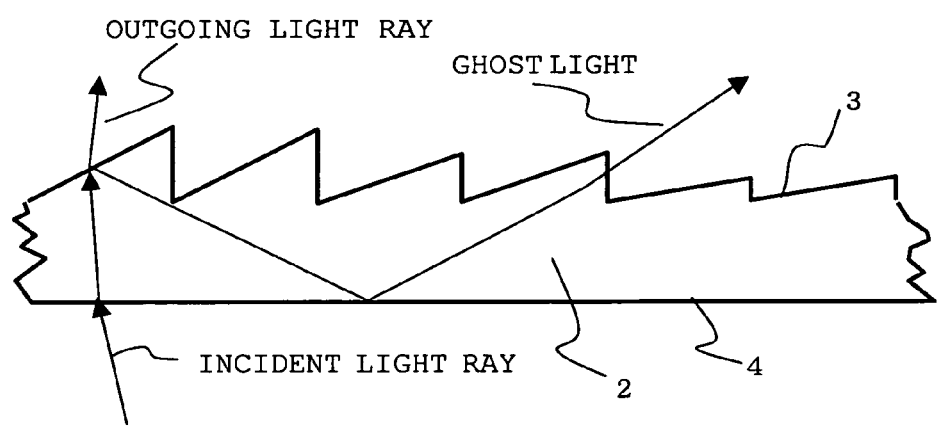
FIG. 2 is a schematic cross sectional view explaining a ghost generation light path in a Fresnel lens sheet.
Figure 4:
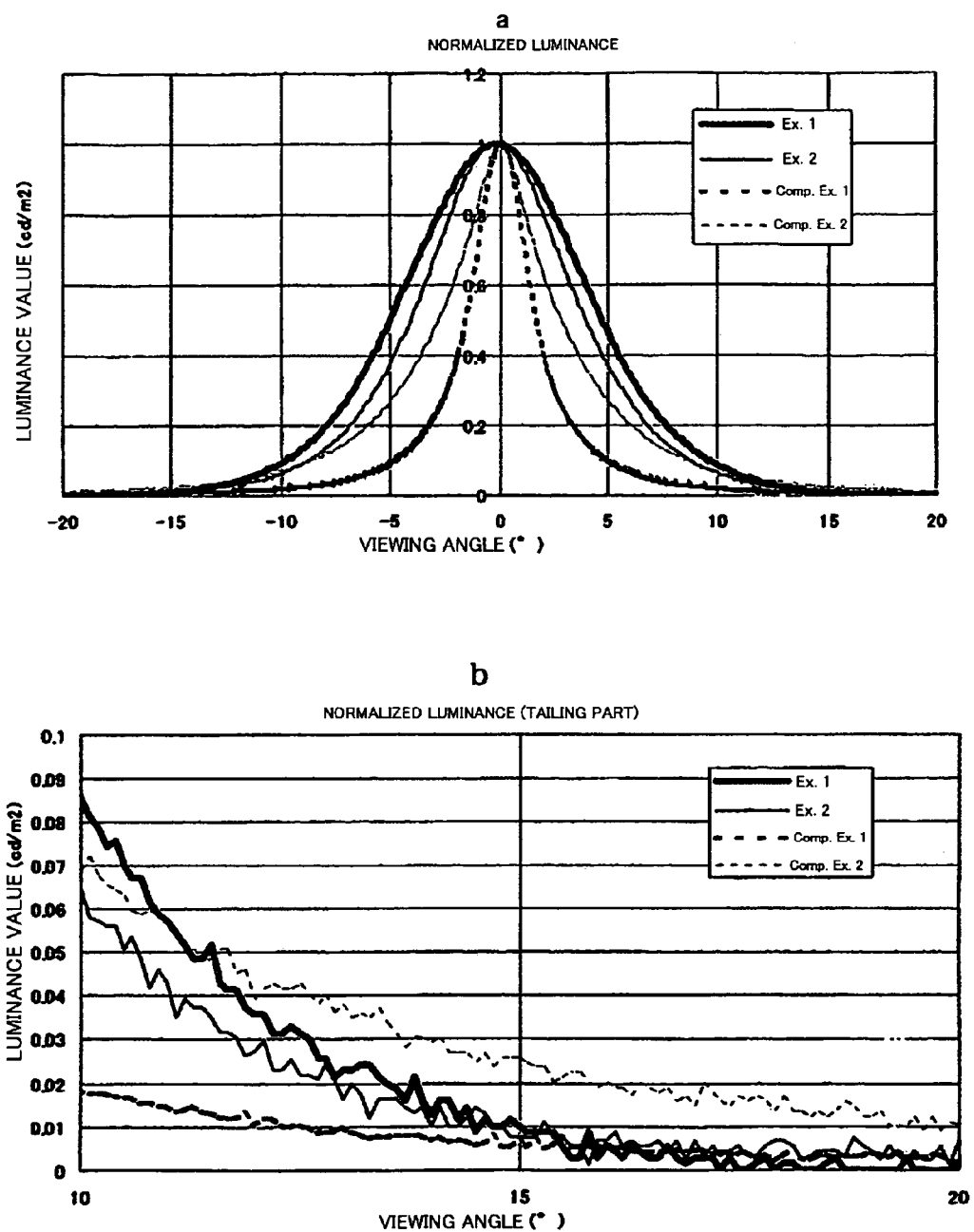
FIG. 4 includes charts showing viewing angle luminance characteristics, which are standardized by the front luminance in the embodiments and the comparison examples in the present invention.

In addition, with this fine concavity and convexity, a stray light reflected from the Fresnel surface 3 as shown in FIG. 2 is hardly reflected entirely from the incidence plane 4 of the Fresnel lens sheet. Therefore, double image can be restricted remarkably. Furthermore, since it is possible to drastically reduce the usage amount of expensive diffusing agent, manufacturing with low cost can be achieved.

If a major diffusive effect is given by the surface concavity and convexity, the above diffusion characteristics can be satisfied. Reasons for this are assumed as the following.

When a light ray is incident on a diffusion sheet containing a diffusing agent, the light ray is refracted by the diffusion agent contained inside. The light ray having been refracted is further refracted by the diffusing agent until it reaches the outgoing surface. In the process above, since there may exist stochastically some light ray substances which have been diffused by the diffusing agent a number of times and subjected to excessive diffusion, it is difficult to restrict a tailing part of viewing angle which are diffused more than necessity. On the other hand, when a light ray is incident on a sheet which causes diffusion by concavity and convexity on the plane of incidence, the diffusion characteristics are decided just by receiving once refraction on the plane of incidence. Therefore, the tailing part of the viewing angle that is subjected to diffusion can be restricted. In addition, according to the present invention, in FIG. 2, when the a ghost light reflected from the Fresnel surface 3 reaches the incidence plane 4, a substance which makes the incident angle smaller than a critical angle is generated, since there are concavity and convexity on the surface. Therefore, it is possible to restrict the ghost light because of a reason, for example, only a part of the ghost light reaches the outgoing surface side. Particularly, there is a remarkable effect in restricting double image.

In the Haze measuring method prescribed in JIS-K7105, if the Haze measured value of the Fresnel lens sheet having the diffusion characteristics of the present invention is assumed as H, and the Haze measured value of a Fresnel lens sheet which is identical to that of the present invention without containing a diffusing agent is assumed as H1, it is desirable that $$H1/H > 0.5$$

is satisfied as a proportion of contribution to the diffusion effect, which is provided by the surface concavity and convexity. Out of the above range, the proportion of the diffusing agent which contributes to the diffusion effect becomes larger, and the present invention may not show sufficient advantage. More preferably, $H1/H > 0.8$, and $H1/H > 0.9$ is further preferable.

In the present invention, when surface roughness Ra is equal to or less than 0.5 µm, there is a possibility that sufficient diffusion characteristics may not be given. When it is equal to or more than 2.0 µm, speckles may not be reduced enough. A desirable range is from 0.6 µm to 1.5 µm.

It is preferable that the above surface concavity and convexity are formed randomly. If regularity is given to the surface concavity and convexity, there is a possibility that moire occurs with the Fresnel lens line and/or with the lenticular lens line.

As a method for forming the above surface roughness on the Fresnel lens sheet of the present invention, for example, there are some ways as the following: a method which mixes a light diffusing agent causing almost even refraction into a base material and performs extrusion, to form a substrate having a concavity and convexity surface at least on one plane, then, this concavity and convexity surface is set as a plane of incidence, and a Fresnel lens is formed on the opposite surface; a method which performs sandblasting on the plane of incidence of the Fresnel lens sheet; and so called etching method which dissolves the plane of incidence of the Fresnel surface and/or the plane of incidence of the Fresnel lens by use of chemicals, such as solvent, alkali, and acid, and forms concavity and convexity surface. In order to employ the etching method, there are some ways including a method in which particles having a dissolution speed different from that of the base material are made to be contained into the proximity of the plane of incidence, and then, dissolving process with chemicals is performed, and a method in which the plane of incidence is formed with a plurality of base materials having different dissolution speed, and then, dissolving process with chemicals is performed. It is further possible to use a method where a forming die of the plane of incidence of the Fresnel surface and/or Fresnel lens sheet is formed in corrugated surface by use of the above method, and with this corrugated surface die, the Fresnel lens sheet is molded.

The Fresnel lens sheet according to the present invention is combined with the lenticular lens sheet, whereby it is possible to obtain a rear projection screen of the present invention. As a lenticular lens sheet used in the rear projection screen of the present invention, it is possible to use vertically long cylindrical lenses, conventionally known, which are placed side by side in a transverse direction, and a shielding pattern made of light absorbing layers is provided on a part where a projection light on the outgoing surface side may not pass through. It is further possible to employ a micro lens array in which fine independent lenses are placed side by side in a lattice-like pattern, instead of the above cylindrical lens. It is further possible to employ a combination of a lenticular lens in which cylindrical lenses are arranged side by side in a transverse direction, and a lenticular lens in which cylindrical lenses are arranged side by side in a vertical direction.

Hereinafter, examples of the present invention will be explained.

EXAMPLE 1

By use of a forming die which has a matte surface having been formed by applying sand blasting processing on a stainless surface, and a forming die of mirror plane, a sheet is prepared which is made of polymethacrylic styrene copolymerization (MS) resin, the sheet having a mat on one surface and a mirror plane on the opposite surface. Then, on the side of mirror plane, a Fresnel lens is formed with ultraviolet curing resin, thereby preparing a Fresnel lens sheet. Refraction index of the sheet made of MS resin is 1.54, and a diffusing agent is not contained inside. Thickness is 2 mm, surface roughness of the matte surface Ra=0.9 µm, and Haze value is 70%. Table 1 shows viewing angle characteristics of the sheet made of acrylic resin. A transmitting screen is structured by placing the Fresnel lens sheet on a projector side and a lenticular lens sheet with 0.1 mm pitch and shielding pattern ratio of 65% is placed on a viewer side, and it is mounted on an LCD projection television set. Then, the front gains and speckles are visually evaluated. The above results are combined and shown in Table 1. The transmitting screen using the Fresnel lens sheet according to the present invention has achieved high gains and small speckles.

EXAMPLE 2

With the same conditions as Example 1, except that 0.2% of diffusing agent made of MS (average particle diameter is 8 µm, refraction index is 1.54) is contained in the sheet made of resin, and surface roughness of the matte surface Ra=0.7 µm, a Fresnel lens sheet is prepared. Haze value of the sheet is 65%. Table 1 shows viewing angle characteristics of the sheet made of acrylic resin. In the same manner as shown in Example 1, the Fresnel lens sheet is mounted on an LCD projection television set, and the front gains and speckles are visually evaluated. The above results are combined and shown in Table 1. The transmitting screen using the Fresnel lens sheet according to the present invention has achieved high gains and small speckles.

EXAMPLE 3

With the same conditions as Example 1, except that 0.7% of diffusing agent made of MS (average particle diameter is 10 μm, refraction index is 1.56) is contained in a sheet made of resin and a format die having mirror planes on both sides is used, a Fresnel lens sheet is prepared. Haze value of the sheet is 60%. Table 1 shows viewing angle characteristics of the sheet made of acrylic resin. In the same manner as shown in Example 1, the Fresnel lens sheet is mounted on an LCD projection television set, and the front gains and speckles are visually evaluated. The results are combined and shown in Table 1. The transmitting screen using the Fresnel lens sheet according to the present invention has achieved high gains and small speckles.

$4b$ is a chart showing an expanded region where $\theta$ is large in FIG. $4a$. Furthermore, FIG. $5a$ is a chart showing a result obtained by standardizing the total quantity of outgoing light at a particular angle $\theta$ with respect to the total outgoing light quantity, the results being from respective Examples for the angle $\theta$. FIG. $5b$ is a chart showing an expanded region where $\theta$ is large in FIG. $5a$. It is found that the light amount outgoing from the Fresnel lens sheets of Comparison Examples is larger in a large viewing angle region ($\theta$ is large), comparing to the Fresnel lens sheet as shown in the above Examples.

TABLE 1

List of Results from Examples and Comparison Examples in the Present Invention

| | Haze of Substrate (%) | Surface Roughness Ra(μm) | Gain | Speckles (Note) | Viewing Angle characteristics | | Viewing Angle characteristics (deg.) | | |
|---|---|---|---|---|---|---|---|---|---|
| | | | | | $\gamma/\alpha$ | $\zeta/\alpha$ | Half Value Angle $\alpha$ | 1/10 Value Angle $\gamma$ | 1/100 Value Angle $\zeta$ |
| Ex. 1 | 70 | 0.9 | 4.2 | ◉ | 2.0 | 3.1 | 4.85 | 9.8 | 14.8 |
| Ex. 2 | 65 | 0.7 | 4.4 | ◉ | 2.1 | 3.5 | 4.1 | 8.7 | 14.2 |
| Ex. 3 | 60 | | 4.3 | ◉ | 2.7 | 5.7 | 2.2 | 5.9 | 12.6 |
| Comparison Ex. 1 | 50 | | 4.2 | X | 2.9 | 7.6 | 1.65 | 4.85 | 12.5 |
| Comparison Ex. 2 | 70 | | 3.5 | ○ | 3.0 | 6.9 | 2.85 | 8.6 | 19.8 |

(Note) Speckle (dazzling) Evaluation Criteria
◉ Dazzling is almost inconspicuous
○ Dazzling appears but no problem
X Dazzling is intense and unsuitable for viewing

COMPARISON EXAMPLE 1

With the same conditions as Example 1, except that two mirror-plane format dies are used, a diffusing agent made of glass particles (average particle diameter is 8 μm, refraction index is 1.56) is mixed, concentration is adjusted to make the Haze value as 50%, and an MS resin-made sheet, being 2 mm in thickness, having mirror planes on both sides is prepared. A transmitting screen is prepared in the same manner as shown in Example 1 except that the resin-made sheet of the Comparison Example 1 is employed, so as to be mounted on an LCD projection television set, and the front gains and speckles are visually evaluated. The results are combined and shown in Table 1. The transmitting screen using the Fresnel lens sheet of Comparison Example 1 has achieved high gains similar to the Example 1, but the speckles are conspicuous and thus impairing quality of a projected image.

COMPARISON EXAMPLE 2

In the same manner as shown in Comparison Example 1 except that the concentration of diffusing agent is adjusted to make the Haze value to 70%, a transmission screen is prepared and it is mounted on an LCD projection television set. Then, the front gains and speckles are visually evaluated. The result is combined and shown in table 1. The speckles of the transmitting screen using the Fresnel lens sheet of Comparison Example 2 are relatively small, but gains are low, rendering the projected image dark.

Results from each of the Examples and Comparison Examples are shown in Table 1, and FIG. $4a$ shows a chart of the viewing angle characteristics of each Example. FIG.

INDUSTRIAL APPLICABILITY

With the Fresnel lens sheet according to the present invention, it is possible to provide a transmitting screen which is bright, while restricting the speckles.

What are claimed are:

1. A Fresnel lens sheet that is used in a rear projection screen,
wherein diffusion characteristics of the sheet are defined to be within the range of the following expression (1) and expression (2), $$\gamma/\alpha \leq 2.8 \tag{1}$$

$$\zeta/\alpha \leq 6 \tag{2}$$

here, $\alpha$ indicates viewing half value angle, $\gamma$ indicates viewing 1/10 value angle, and $\zeta$ indicates viewing 1/100 value angle.

2. A Fresnel lens sheet that is used in a rear projection screen,
wherein diffusion characteristics of the sheet are defined to be within the range of the following expression (3), expression (4), and expression (5), $$2.0° \leq \alpha \leq 5.5° \tag{3}$$

here, $\alpha$ indicates viewing half value angle;

$$\gamma \leq 12° \tag{4}$$

here, $\gamma$ indicates viewing 1/10 value angle; and $$\zeta \leq 18° \tag{5}$$

here, $\zeta$ indicates viewing 1/100 value angle.

3. The Fresnel lens sheet according to claim 1 or 2, comprising fine concavity and convexity on an incidence plane surface of the sheet, and the concavity and convexity are defined to be within the range of the following expression (6):

$$0.5 \ \mu m \leq Ra \leq 2.0 \ \mu m \quad (6),$$

here, Ra indicates central line average roughness that is prescribed in JIS B 0601.

4. A rear projection screen comprising at least a Fresnel lens sheet and a lenticular lens sheet, wherein the Fresnel lens sheet is the Fresnel lens sheet according to claim 3.

5. A rear projection screen comprising at least a Fresnal lens sheet and a lenticular lens sheet, wherein the Fresnal lens sheet is the Fresnal lens sheet according to any one of claims 1 or 2.

* * * * *